CROSS BAR SYSTEM AUTOMATIC TELEPHONE EXCHANGE

Filed Nov. 29, 1957

2,972,020

CROSS BAR SYSTEM AUTOMATIC TELEPHONE EXCHANGE

Kunishige Nogami and Tetsuo Hotta, Yokohama City, and Ryokichi Torisu, Tokyo, Japan, assignors to Hitachi Limited, Tokyo, Japan Filed Nov. 29, 1957, Ser. No. 699,642

Claims priority, application Japan Dec. 28, 1956

3 Claims. (Cl. 179—27.54)

Figures 1, 2:
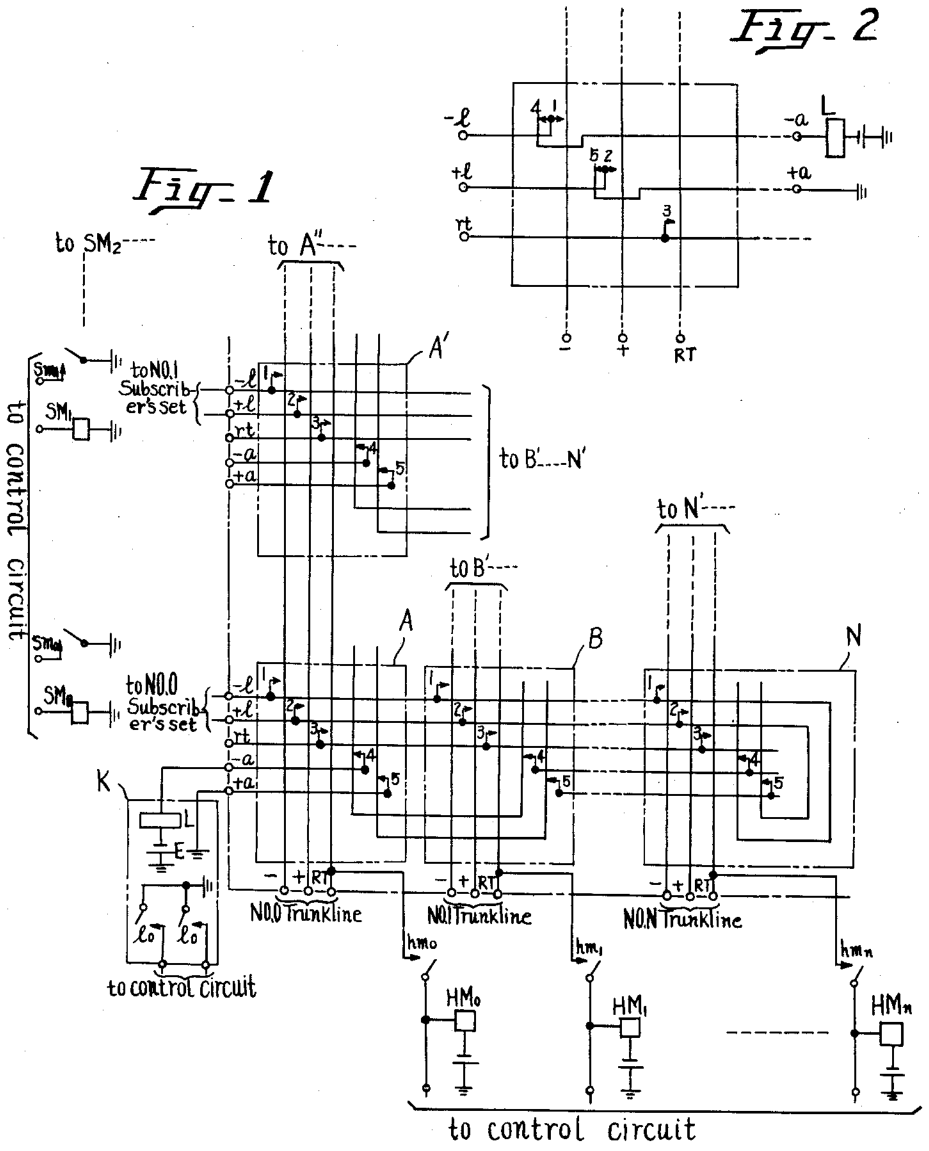

This invention relates to an improvement in an automatic telephone exchange using cross bar switches.

The principal object of this invention is to provide an improved automatic telephone exchange for eliminating cut-off relays which heretofore were necessarily provided for exchange equipment usually one for each line.

In the cross bar system automatic telephone exchange used heretofore, the subscriber circuit is usually provided with a line relay which receives an originating call, and a cut-off relay for cutting off the line relay circuit in order to eliminate any disturbance during conversation.

The specially designed cross bar switch according to this invention functions to cut off the line relay corresponding to the subscriber's line which is connected to a horizontal path on the side of a selecting magnet. A chain circuit is made out in the horizontal path by the break contacts installed at the cross points of cross bar switch. Then the line relay is connected to the extremity of the chain circuit. This causes the cross bar switch to cut-off the line relay. This cut-off operation is caused by the operation of holding magnet during the use of the lines connected to the horizontal path. Therefore, the cut-off relays which were necessary, one for each line, in the former exchange equipment can be eliminated.

For a better understanding of this invention, reference is made to the accompanying drawing, in which Fig. 1 is used to illustrate a circuit diagram of the cross bar switch circuit on the subscriber stage showing an embodiment of the cross bar system automatic telephone exchange according to this invention, and Fig. 2 illustrates a variation of switches in the circuit.

Referring to Fig. 1 of the drawings which illustrates a preferred mode for carrying out the invention, the reference letters A, B, . . . N and A' designate a respective one of each of the contact groups respectively showing the cross points of a cross bar switch, and the reference numerals 1, 2 and 3 designate make contacts, while reference numerals 4 and 5 designate break contacts in each of the groups A, B, . . . N and A'. The symbols —*l*, +*l*, RT, —*a* and +*a* designate the input terminals on each of the horizontal paths of a cross bar switch respectively, that is, they are on the side of selecting magnets; terminals —*l* and +*l* being connected to a subscriber's set, while terminals —*a* and +*a* are connected to the line relay associated with the subscriber's set and a source of reference potential or ground, respectively. The symbols (—), (+) and RT represent the terminals on each of the vertical paths of a cross bar switch, that is, the holding magnet side leading to the trunk lines.

L represents a line relay arranged in the subscriber circuit K adapted to be operated in accordance with the subscriber's originating call.

The movable springs at make contacts 1, 2 and 3 of A, B, . . . and N contact groups in the horizontal path are connected in multiple, and then they are connected to terminals —*l*, +*l* and RT respectively, and also terminals —1 and +1 lead to a subscriber's set.

The fixed springs of make contacts 1, 2 and 3 of A, A' . . . contact groups in vertical path are made of metal strips, connected to terminals (—), (+) and RT, and then lead to the trunk lines of the vertical path.

Thus, in accordance with this invention, between A and B, the third and the fourth etc. the fixed springs of contacts 4 and 5 are inter-connected, and between B and the third, the fourth and the fifth etc. the movable springs of contacts 4 and 5 are inter-connected.

These series connections of break contacts are repeated from A to N to form a chain circuit, and the terminals of this chain circuit at contact group A are connected to the line relay and the ground, respectively, through terminals —*a* and +*a*. The other terminals, i.e., the terminals of the chain circuit at contact group N, are connected to the subscriber's line through the extremities of make contacts 1 and 2 which are connected in multiple.

If the make and break contacts are so arranged and connected as mentioned above, the cut-off relays which were required in the prior arrangements, one per subscriber, can be eliminated, for the following reasons:

Contacts 1, 2, 3, 4 and 5 in the group A are operated when No. 0 selecting magnet $SM_0$ is operated and then the No. 0 holding magnet $HM_0$ is operated, and the contacts are maintained in respective positions after once being operated by the holding magnet $HM_0$ even if the selecting magnet $SM_0$ has been released. If the contacts 1, 2, 3, 4 and 5 of the group A are operated, No. 0 subscriber's lines are connected to No. 0 trunk lines by the now closed contacts 1, 2 and 3. Similarly if No. 0 selecting magnet $SM_0$ and No. 1 holding magnet $HM_1$ are operated the contacts 1, 2, 3, 4 and 5 in the group B are operated, and if No. 1 selecting magnet $SM_1$ and No. 0 holding magnet $HM_0$ are operated, the contacts in the group A' are operated.

When No. 0 subscriber lifts his handset to originate a call, the line relay L is operated by a circuit through the battery E—relay L—terminal (—*a*)—contact 4 in the group A—contact 4 in the group B—contact 4 of the group N (chain circuit)—terminal (—*l*)—No. 0 subscriber's loop—terminal (+*l*)—contact 5 of the group N—contact 5 of the group B—contact 5 of the group A—terminal (+*a*)—ground so that the originating call and postion of the subscriber are indicated to the control circuit (not shown in the drawing). The control circuit selects an idle trunk line such as No. 0 trunk line and operates the No. 0 selecting magnet $SM_0$ corresponding to No. 0 subscriber and when the receiver is operating, the operation of selecting magnet $SM_0$ is indicated by means of the contact $SM_0$ and hence the No. 0 holding magnet $HM_0$ operates so that the contacts 1, 2, 3, 4 and 5 in the group A are operated. This operation is maintained by the holding magnet $HM_0$ even if the selecting magnet has been released. In this case, No. 0 subscriber's lines connected to No. 0 trunk lines by the contacts 1, 2 and 3 and the circuit of line relay L in the subscriber circuit K connected to the subscriber's lines are, at this time, cut-off by the opening of contacts 4 and 5. The contacts at this cross point are operated by means of their associated selecting magnet and holding magnet in connecting any subscriber with any trunk line. Therefore, when a subscriber lifts his handset, the line relay operates. But if it is connected to the trunk line once, the circuit of the line relay to be operated is infallibly cut-off by means of contact of this cross point. In other words, after the contacts 4 and 5 at the cross points of the cross bar switches have been once operated, they are held by means of the holding magnet even when the selecting magnet is released, so that the subscriber's lines and trunk lines remain in the connected condition during the holding of the holding magnet, but normally connected lines of the line relay L are cut-off so that the object of the cut-off can be attained.

As apparent from the above description, the contacts at the cross points of the cross bar switches of the heretofore known type were provided with a connection between the input lines and output trunks only and a cut-off relay is provided per subscriber for cutting off the circuits of the line relay, but according to this invention the object of the above cutting off can be attained by the installation of the break contact chain in the line relay circuit of the cross bar switches of the cross bar system automatic telephone exchange.

The cross bar system automatic telephone exchange according to this invention not only has a function to cut-off a line relay from a subscriber's line, but also, in many cases, has another function to cut-off indication circuits on the line of the selecting magnet side immediately after any indication is received.

Instead of using a make and a break contact at the cross point of a cross bar switch as described above with reference to the drawing, a transfer contact may be available to accomplish the same purpose. For instance, Fig. 2 shows that make contact 1 and break contact 4 in one contact group can instead be transfer contacts 1 and 4. In Fig. 2, a line relay is connected to the extremity of a chain circuit by contacts 4 or 5.

What we claim is:

1. An automatic telephone exchange comprising one or more cross bar switches, each of said cross bar switches including a plurality of vertical and horizontal paths, a like plurality of contacts with one contact operatively associating one horizontal path with one vertical path of each of said cross bar switches, said cross bar switches being arranged in columns and rows, one selecting magnet being coupled to each said row of a cross bar switch, at least two holding magnets, one holding magnet being coupled to each said column of a cross bar switch and a call circuit coupled to a path on the side of said selecting magnet, one of the contacts associated with each said cross points of cross bar switches being a break contact for controlling said call circuit.

2. The system as claimed in claim 1, including a line relay coupled to one of said break contacts, each of said cross bar switches having at least one break contact connected in series with the break contact in the path on the side of each selecting magnet, said line relay being connected to said call circuit through said break contacts in a row whereby to cut off said line relay when said circuit is connected.

3. The system as claimed in claim 2, in which one of said break contacts is connected by means of one of said horizontal paths to said ground of each said row and another of said break contacts is connected by means of said horizontal path to said line relay whereby to cut off said line relay from said call circuit.

References Cited in the file of this patent

UNITED STATES PATENTS

| | | |
|---|---|---|
| 2,341,029 | Field | Feb. 8, 1944 |
| 2,396,077 | Blackhall | Mar. 5, 1946 |
| 2,802,903 | Rommel | Aug. 13, 1957 |